(12) United States Patent
Lamanna

(10) Patent No.: US 11,795,925 B2
(45) Date of Patent: Oct. 24, 2023

(54) ROADWAY ENERGY GENERATION SYSTEM

(71) Applicant: Stephen Michael Lamanna, Cape May Court House, NJ (US)

(72) Inventor: Stephen Michael Lamanna, Cape May Court House, NJ (US)

( * ) Notice: Subject to any disclaimer, the term of this patent is extended or adjusted under 35 U.S.C. 154(b) by 0 days.

(21) Appl. No.: 17/656,989

(22) Filed: Mar. 29, 2022

(65) Prior Publication Data

US 2023/0115119 A1 Apr. 13, 2023

Related U.S. Application Data

(60) Provisional application No. 63/262,299, filed on Oct. 8, 2021.

(51) Int. Cl.
| | |
|---|---|
| *F03G 7/08* | (2006.01) |
| *F15B 13/02* | (2006.01) |
| *G08B 21/18* | (2006.01) |
| *F15B 1/26* | (2006.01) |

(52) U.S. Cl.
CPC ............ *F03G 7/087* (2021.08); *F03G 7/085* (2021.08); *F15B 1/26* (2013.01); *F15B 13/027* (2013.01); *G08B 21/182* (2013.01)

(58) Field of Classification Search
CPC .. F03G 7/087; F03G 7/085; F15B 1/26; F15B 13/027; G08B 21/182
See application file for complete search history.

(56) References Cited

U.S. PATENT DOCUMENTS

| | | | |
|---|---|---|---|
| 3,885,163 A | 5/1975 | Toberman | |
| 4,004,422 A | 1/1977 | Le Van | |
| 4,081,224 A * | 3/1978 | Krupp | F03G 7/08 417/244 |
| 4,130,064 A | 12/1978 | Bridwell | |
| 4,238,687 A | 12/1980 | Martinez | |
| 4,418,542 A | 12/1983 | Ferrell | |
| 4,739,179 A | 4/1988 | Stites | |
| 6,767,161 B1 | 7/2004 | Calvo et al. | |
| 6,936,932 B2 | 8/2005 | Kenney | |
| 7,102,244 B2 | 9/2006 | Hunter, Jr. | |
| 7,145,257 B2 | 12/2006 | Ricketts | |
| 7,530,761 B2 | 5/2009 | Kenney | |
| 7,589,427 B2 | 9/2009 | Davis | |

(Continued)

*Primary Examiner* — Viet P Nguyen
(74) *Attorney, Agent, or Firm* — Dunlap Bennett & Ludwig, PLLC; Anna L. Kinney

(57) ABSTRACT

An electricity generation system includes a treadle module embedded in a roadway in a housing configured perpendicular to traffic flow. The treadle module includes a treadle which moves between an at-rest position and an actuated position, an electric generator, and a hydraulic cylinder mounted within the housing and connected to the treadle. The hydraulic cylinder has a check valve. A hydraulic reservoir connected to the hydraulic cylinder by way of hydraulic conduit modulates hydraulic pressure in the electricity generation system. A method of recovering energy from automotive vehicles includes embedding the electricity generation system in the roadway and routing traffic flow over the treadle array such that the traffic flow repeatedly depresses the treadle stave. The depressed treadle stave actuates the generator to produce electricity. The hydraulic cylinder returns the treadle stave to its at-rest position.

9 Claims, 4 Drawing Sheets

(56) References Cited

U.S. PATENT DOCUMENTS

| | | |
|---|---|---|
| 7,629,698 B2 | 12/2009 | Horianopoulos et al. |
| 8,123,431 B2 | 2/2012 | Chen |
| 9,212,654 B2 | 12/2015 | Kennedy |
| 2002/0089309 A1 | 7/2002 | Kenney |
| 2003/0034652 A1 | 2/2003 | Slatkin |
| 2004/0042852 A1 | 3/2004 | Alperon |
| 2007/0020047 A1* | 1/2007 | Adair ................ E01F 11/00 404/71 |
| 2007/0264081 A1 | 11/2007 | Chiu |
| 2009/0179433 A1* | 7/2009 | Kenney ............... F01D 17/26 290/1 R |
| 2009/0315334 A1 | 12/2009 | Chen |
| 2011/0148121 A1 | 6/2011 | Kenney |
| 2016/0380511 A1 | 12/2016 | Kennedy |
| 2019/0044413 A1 | 2/2019 | Mokoenene |
| 2022/0049441 A1* | 2/2022 | Giannotta ............ H02K 7/1853 |

* cited by examiner

ROADWAY ENERGY GENERATION SYSTEM

CROSS-REFERENCE TO RELATED APPLICATION

This application claims the benefit of priority of U.S. provisional application No. 63/262,299, filed Oct. 8, 2021, the contents of which are herein incorporated by reference.

BACKGROUND OF THE INVENTION

The present invention relates to energy recovery and, more particularly, to a roadway energy generation system.

The present trend is toward more vehicular traffic and more roadways, bridges, overpasses, and underpasses that concentrate traffic flow. The need for electrical power increases throughout municipalities and state highways, with energy costs rising and public institutions financially strapped to meet these increasing costs. Future demand for electricity will increase exponentially as the use of, and dependence upon, hybrid and electrical vehicles for transportation becomes more prevalent.

Vehicular traffic represents a readily available and accessible source of environmentally safe, cost-effective energy. It is not harnessed by currently available electricity generating methods which instead require costly fuels.

As can be seen, there is a need for environmentally safe, cost-effective electrical power generation in communities and along roadways and bridges, including electricity to power electric-powered and hybrid vehicles.

SUMMARY OF THE INVENTION

In one aspect of the present invention, an electricity generation system is provided, comprising a treadle module embedded in a roadway, including: a housing configured perpendicular to traffic flow; a treadle, mounted on the housing, operative to move between an at-rest position and an actuated position and configured to be actuated by a passing vehicle; at least one electric generator mounted within the housing and coupled to the treadle; and at least one hydraulic cylinder mounted within the housing and coupled to the treadle, said hydraulic cylinder having a check valve; and a hydraulic reservoir in hydraulic communication with the at least one hydraulic cylinder by way of hydraulic conduit, said hydraulic reservoir being operative to modulate hydraulic pressure in the electricity generation system.

In another aspect of the present invention, method of recovering energy from automotive vehicles is provided, comprising: embedding an electricity generation system in a roadway perpendicular to traffic flow, said electricity generation system comprising a treadle array comprising at least one treadle module having a treadle stave, a treadle stave mounting, a housing, at least one generator and at least one hydraulic cylinder, wherein the treadle stave is coupled to the at least one hydraulic cylinder and to the at least one generator such that the treadle stave, when depressed, actuates the at least one generator to produce electricity, wherein the at least one hydraulic cylinder is operative to return the treadle stave to an at-rest position from an actuated position; coupling the at least one hydraulic cylinder to a hydraulic accumulator reservoir operative to modulate hydraulic pressure in the electricity generation system; and routing traffic flow over the treadle array such that the traffic flow repeatedly depresses the treadle stave.

The present invention harnesses the motion of roadway or highway automotive vehicles, recovering energy therefrom to generate electricity, especially in areas where vehicular traffic is concentrated and rapid, particularly including traffic crossing bridges and overpasses. This system supports the development and production of more efficient components that may be indicated through the trial and use of any currently available components in the roadway energy generation process described herein.

The electricity generated by this invention may supplement any existing systems with an efficiency that is far superior to existing systems and does not require the consumption of costly fuels to generate electrical energy. The electricity generated may be used immediately to provide energy for lighting or power demand by cities, bridges, or highways or may be used at charging stations to recharge electric vehicles. Existing storage cells or high-capacity batteries used to store electricity generated by wind, solar, or other sources may be implemented or adapted for storage of electricity generated by the inventive system. Stored hydraulic power may power equipment related to the maintenance and upkeep of the roadway generating station and/or the respective bridge or overpass.

These and other features, aspects and advantages of the present invention will become better understood with reference to the following drawings, description, and claims.

DETAILED DESCRIPTION OF THE INVENTION

Figure 1:
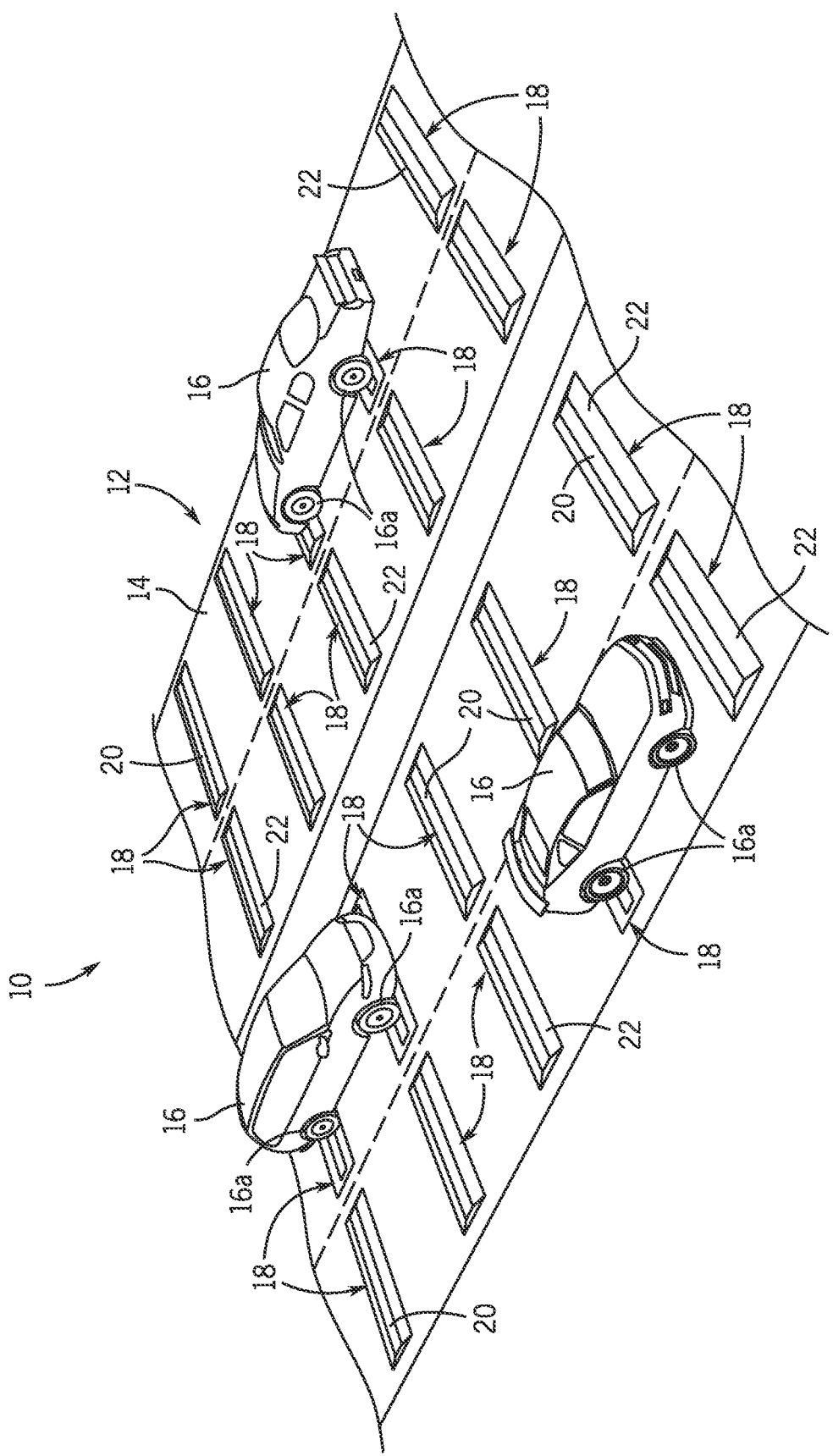
FIG. 1 is a front perspective view of an energy generation system according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is an electricity generation system comprising treadles embedded in a roadway that utilize traffic to activate various devices.

A treadle is a resilient, highly flexible raised element within and crossing the roadway that is easily depressed by the vehicle tires/wheels passing directly above. A treadle array, which may include a series of treadle modules, hydraulic and/or spring-loaded, may be embedded in a roadway, arranged sequentially, in housings configured perpendicular to the traffic flow so that these treadles are engaged and depressed by vehicle wheels traveling over them when traffic flow is routed over the treadle array. The treadle generally accepts vehicular activation from either direction. Reversing over the treadle generally does not damage the vehicle or tires and activates generators. Energy is directly or indirectly generated by the repeated fluctuations of the treadle as it is activated by vehicular traffic flow.

Energy is generated directly as the treadle repeatedly engages a series of Linear Generators which produce electricity. Passing vehicles engage and depress the treadle, activating generators selected from the group consisting of linear electrical generators, hydraulic off-site cam-driven rotary electrical generators, and a combination thereof. The treadle serves to distribute the burden or impact of each strike in such a manner as to engage/activate all the linear generators within a treadle housing so that any vehicle traversing the device generates electricity, whether this vehicle is a four-wheeled vehicle, a multi axle truck or a motorcycle. The electricity generated by the treadle (within a significant series of such treadles) flows to transformers and/or electrical storage devices. For example, the electricity may be carried by electrical cables to large capacity storage batteries such that the batteries electrically communicate with the electric generators in the treadle module.

Energy is generated indirectly as the treadle repeatedly directly compresses a series of hydraulic cylinders/pistons as lifters or tappets. The hydraulic cylinders are primarily operative to move the treadle stave quickly and efficiently to return it from its actuated position to its at-rest position—ready for the next wheel strike from vehicular traffic passing above. The hydraulic cylinders maintain the resident, at-rest elevation of the treadle stave at a predetermined sustaining hydraulic pressure. The sequence is: Readiness; Front axle/wheel(s) strike; Recovery; Readiness; Rear axle/wheel(s) strike; Recovery; Readiness; Next vehicle. The system generates energy on the downstroke and on the upstroke.

Constant, at-rest hydraulic pressure is maintained in each hydraulic cylinder with a carefully calibrated check valve which prevents any backflow of accumulating hydraulic pressure into the cylinder. The hydraulic cylinders transmit excess hydraulic pressure acquired by the action of the treadle to a hydraulic accumulator reservoir. Hydraulic power/energy accumulated in the reservoir may drive hydraulic motors that power off-site rotary generators to yield additional electrical energy.

The treadle and the configuration of the linear generators and hydraulic cylinders may maximize the electricity generated from the traversing vehicles' wheels and provide nearly instantaneous recovery so that the treadle is ready in time for the next strike by a vehicle's wheels. The treadle length and the treadle stave in its steel-reinforced tire-grade rubber bed, the depth, and dimensions of the treadle trough as well as the number and size of the linear generators and hydraulic cylinders may be determined through research and development as well as through practical use. All components may be developed and deployed at a number and capacity that provides efficient maximum electricity production without any resulting disturbance to the traversing vehicles. Length, diameter, size, and shape are all parameters that may be optimized for one or more components of the system to optimize output.

A road crew and a few technicians may easily remove a damaged treadle module or a "tired" unit (treadle stave and mountings, treadle trough, linear generators, and hydraulic cylinders) and replace it with a complete new or refurbished unit. The unit may also be partially dismantled and reassembled on site for repair or replacement of any individual component(s).

In some embodiments, amperage metering may be provided for each generator to indicate any drop in efficiency or loss of function, and may be operative to initiate an alert if the generated amperage falls outside of a predetermined range, e.g., with lights, alarms, or computer alert, so that the component may be repaired or replaced.

In some embodiments, the treadle stave is spring loaded with precisely gauged leaf springs. These leaf springs straddle the treadle trough supporting the treadle stave, embedded parallel to the traffic flow in the treadle stave's steel reinforced tire rubber mounting at intervals between the Linear Generators and Hydraulic Cylinders. The springs assist the Hydraulic Cylinders or Pistons in maintaining the resident, at-rest elevation of the treadle stave and/or the resident pressure in the Hydraulic Cylinders without increasing resistance to the downward pressure on the stave by vehicular traffic.

In some embodiments, electrical output may be expanded through modifications including the presence of multiple linear generators whose shafts align, end-to-end, permitting the generation of a maximum amount of energy from each downward (and upward) thrust of the treadle as it activates all of the in line linear generators strung along each central activating shaft. This advantageous modification is available because the range of motion generated by the direct activation of the treadle by passing vehicles is relatively short (several inches), and because there is little or no resistance to the treadle action by each generator. The treadle trough depth may be augmented and/or extension troughs may be piggy-backed to accommodate the additional in-line generators.

Referring to FIGS. 1 through 6, FIG. 1 shows an electricity generating system 10 according to an embodiment of the present invention comprising a treadle array 12 in a roadway 14.

Figure 2:
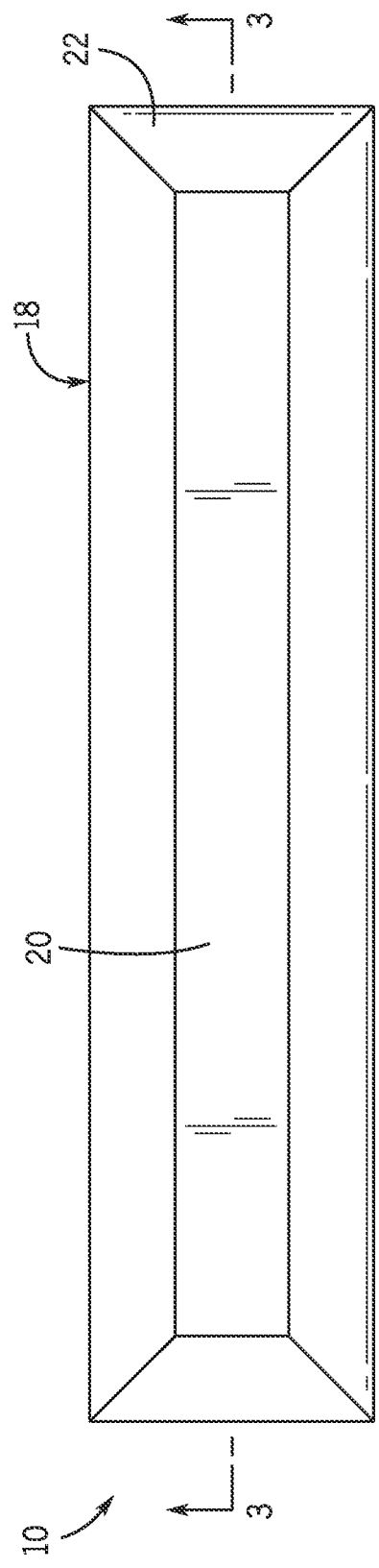
FIG. 2 is a top plan view thereof.

As vehicles 16 traverse the roadway 14, their tires 16a depress treadles 18 comprising a treadle stave 20 mounted in a treadle stave mounting 22; see FIG. 2.

Figure 3:
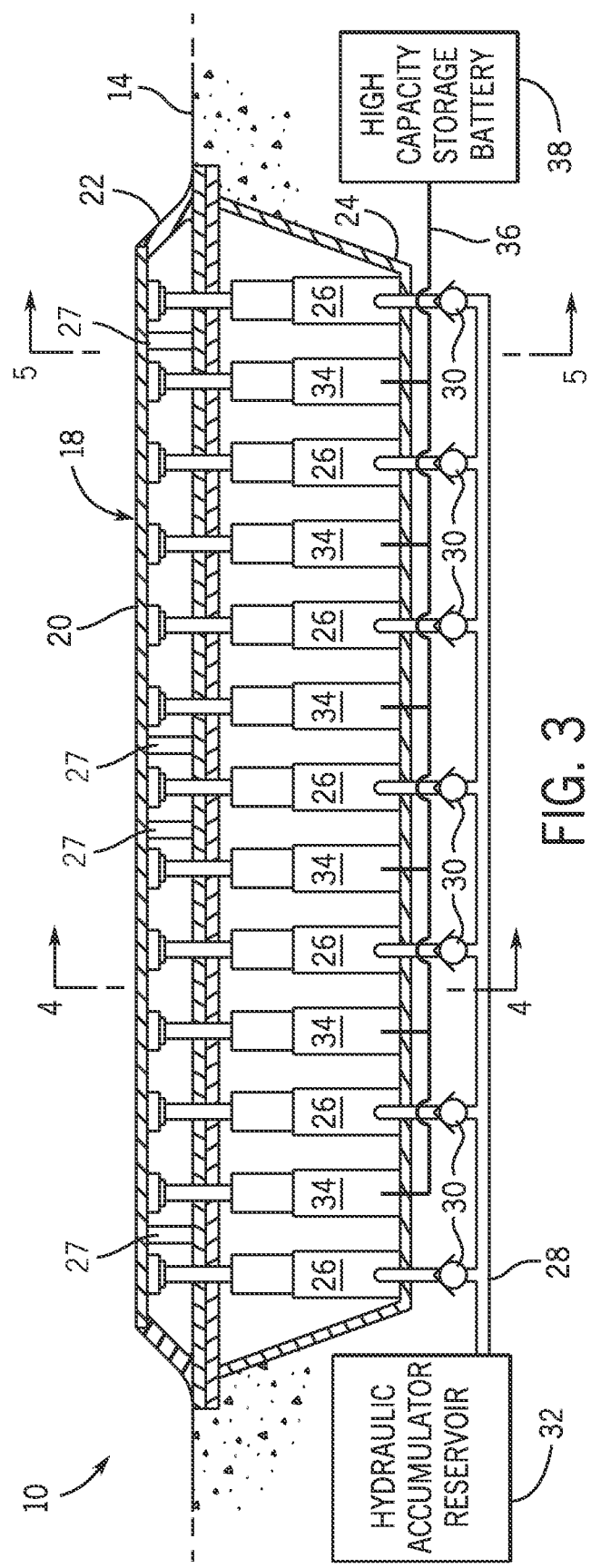
FIG. 3 is a sectional view taken along line 3-3 of FIG. 2.

As most clearly seen in FIG. 3, as the treadle 18 is depressed, the force is transmitted to a series of hydraulic piston/cylinders 26, leaf springs 27, and linear generators 34 encased in a housing 24 beneath the roadway 14. The hydraulic cylinders 26 and the generators 34 are attached, coupled, or otherwise secured in position against the treadle stave 20. The piston/cylinders 26 transmit increased pressure to a hydraulic reservoir, hydraulic accumulator, or hydraulic accumulation reservoir 32 to which they are in hydraulic communication by way of a hydraulic conduit or line 28. Thus, the hydraulic accumulation reservoir 32 modulates hydraulic pressure in the system. Check valves 30 prevent backflow into the cylinders 26. Simultaneously, an electric cable 36 transmits electricity produced by the linear generators 34 to a high-capacity storage battery 38.

Figure 4:
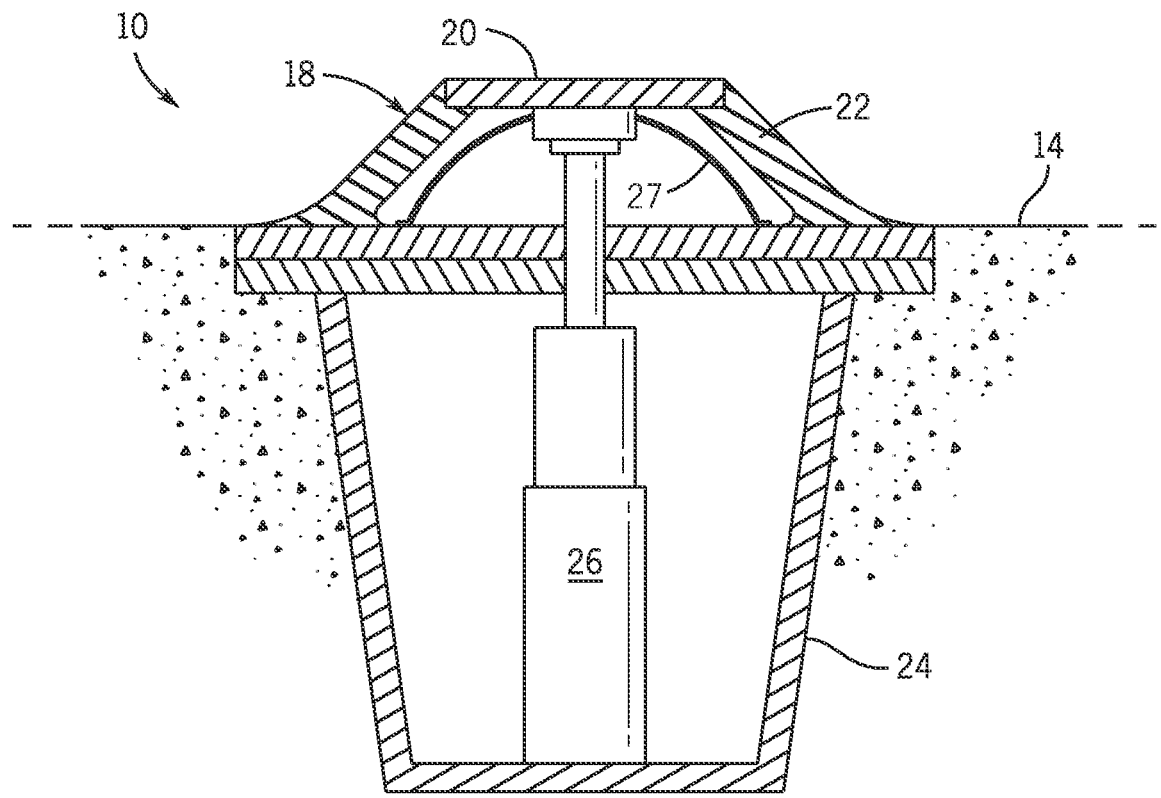
FIG. 4 is a sectional view taken along line 4-4 of FIG. 3.
Figure 5:
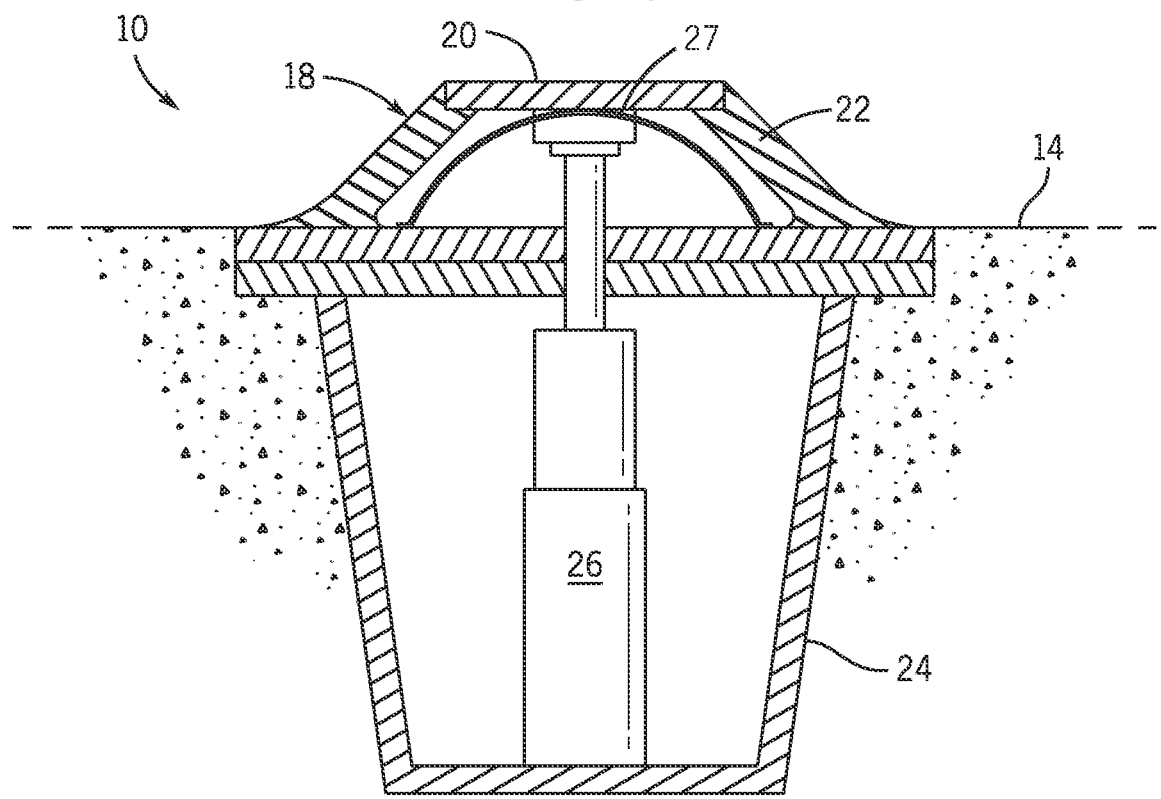
FIG. 5 is a sectional view taken along line 5-5 of FIG. 3.

FIGS. 4 and 5 show additional views of the treadle 18, leaf springs 27, and cylinders 26.

Figure 6:
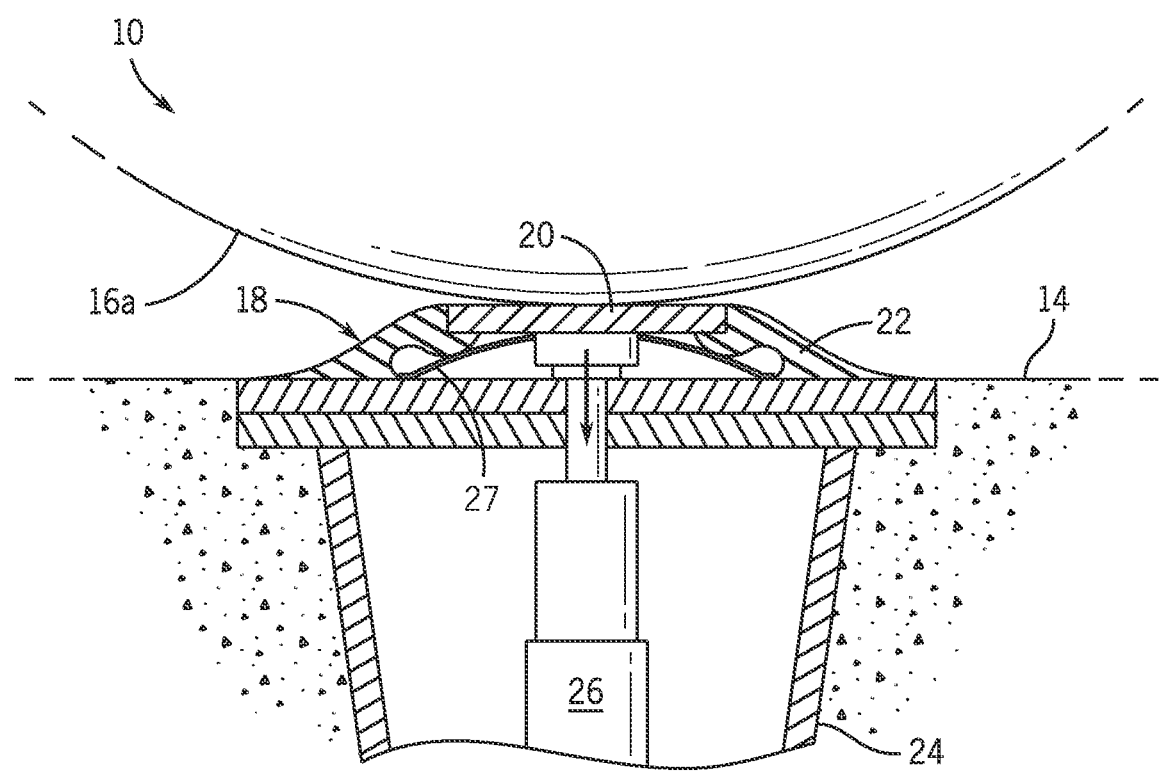
FIG. 6 is a detail sectional view showing the inventive system in an actuated position.

FIG. 6 illustrates the depression of a treadle 18 by a passing vehicle tire 16a, actuating the system.

It should be understood, of course, that the foregoing relates to exemplary embodiments of the invention and that modifications may be made without departing from the spirit and scope of the invention as set forth in the following claims.

What is claimed is:

1. An electricity generation system, comprising:
   a) a treadle module embedded in a roadway, including:
      a housing configured perpendicular to traffic flow;
      a treadle, mounted on the housing, operative to move between an at-rest position and an actuated position and configured to be actuated by a passing vehicle;
      linear generators mounted within the housing and coupled to the treadle; and hydraulic cylinders mounted within the housing and coupled to the treadle, said hydraulic cylinder having a check valve; and b) a hydraulic reservoir in hydraulic communication with the hydraulic cylinders by way of hydraulic conduit, said hydraulic reservoir being operative to modulate hydraulic pressure in the electricity generation system; wherein the linear generators and the hydraulic cylinders are positioned in an alternating configuration along the housing.

2. The electricity generation system of claim 1, wherein the treadle comprises a treadle stave mounted in a treadle stave mounting.

3. The electricity generation system of claim 1, wherein the linear generators have an amperage meter operative to initiate an alert if generated amperage falls outside of a predetermined range.

4. The electricity generation system of claim 1, further comprising a treadle array including the treadle module and additional treadle modules arranged sequentially in the roadway.

5. The electricity generation system of claim 4, wherein the treadle module further comprises a plurality of leaf springs straddling the housing parallel to traffic flow, said leaf springs being operative to spring load the treadle.

6. The electricity generation system of claim 1, wherein the linear generators electrically communicate with a device selected from the group consisting of: a transformer, an electrical storage device, and a combination thereof.

7. The electricity generation system of claim 6, wherein the electrical storage device comprises a battery.

8. A method of recovering energy from automotive vehicles, comprising:

a) embedding an electricity generation system in a roadway perpendicular to traffic flow, said electricity generation system comprising a treadle array comprising at least one treadle module having a treadle stave, a treadle stave mounting, a housing, linear generators and hydraulic cylinders, wherein the linear generators and the hydraulic cylinders are positioned in an alternating configuration along the housing, wherein the treadle stave is coupled to the hydraulic cylinders and to the linear generators such that the treadle stave, when depressed, actuates the linear generators to produce electricity, and wherein the hydraulic cylinders are operative to return the treadle stave to an at-rest position from an actuated position;

b) coupling the hydraulic cylinders to a hydraulic accumulator reservoir operative to modulate hydraulic pressure in the electricity generation system; and c) routing traffic flow over the treadle array such that the traffic flow repeatedly depresses the treadle stave.

9. The method of recovering energy from automotive vehicles of claim 8, further comprising removing and replacing a damaged treadle module.

* * * * *